United States Patent [19]

Michals

[11] 4,005,891
[45] Feb. 1, 1977

[54] BUMPER IMPACT DIVERTOR

[76] Inventor: Theodore T. Michals, Box 71, Lyons, Ill. 60534

[22] Filed: Nov. 18, 1974

[21] Appl. No.: 524,795

[52] U.S. Cl. .............................................. 293/84
[51] Int. Cl.² ...................................... B60R 19/00
[58] Field of Search ................... 293/63, 84–86, 293/89, 95, 70

[56] References Cited

UNITED STATES PATENTS

| | | | |
|---|---|---|---|
| 1,476,478 | 12/1923 | Wharton | 293/84 |
| 1,505,885 | 8/1924 | Hainlen | 293/84 |
| 3,705,742 | 12/1972 | Lipscomb | 293/84 X |
| 3,789,948 | 2/1974 | Hrebicek | 293/84 X |

Primary Examiner—John J. Love

[57] ABSTRACT

The invention disclosed is a shock absorbing device for automobiles, the device comprising a pair of inverted tee-shaped arms, the bars of the tee supporting at one end a bumper and each connected at the other end to a vertically acting shock absorber. The tail of the Tee is short and has its free end pivotally attached to the automobile frame so that horizontal impact in a direction parallel with the bar is transformed into a vertical movement against the shock absorber.

2 Claims, 2 Drawing Figures

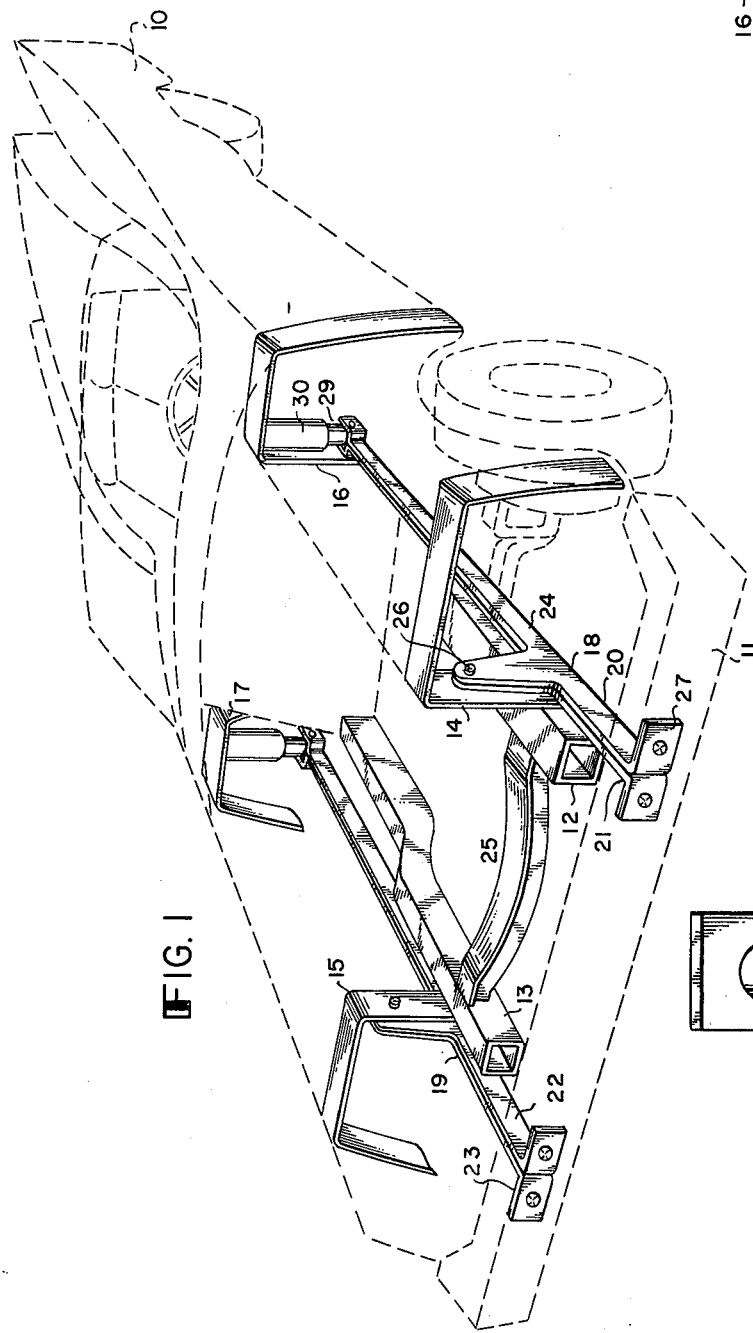
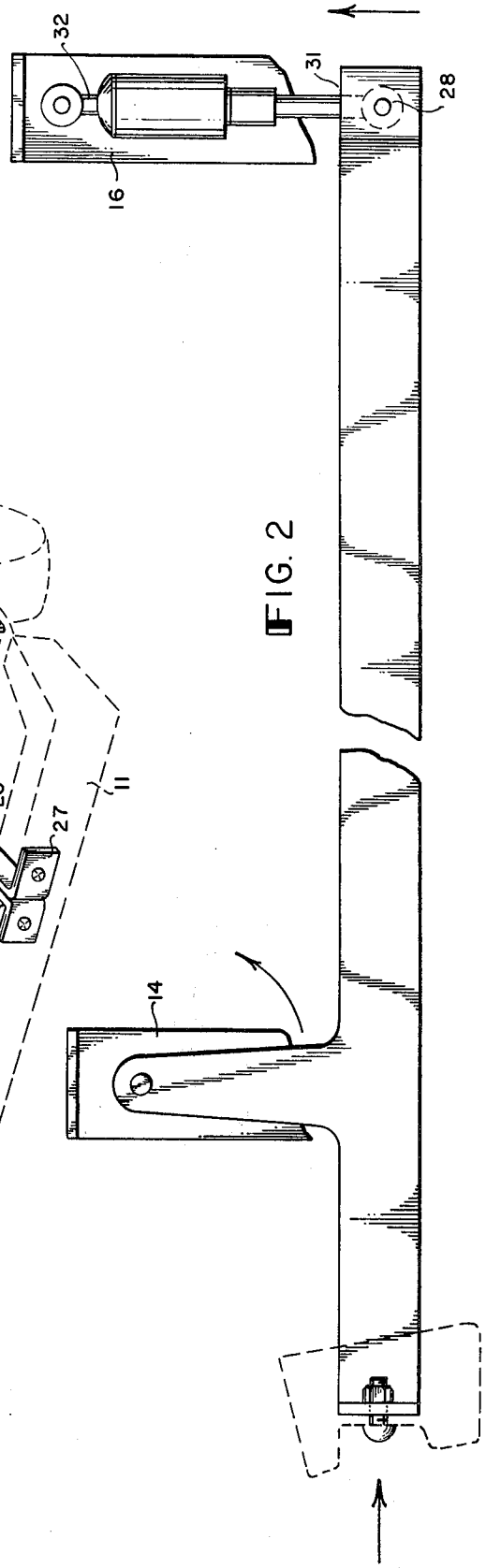

BUMPER IMPACT DIVERTOR

This invention relates to shock absorbing devices for automobiles and particularly to such devices which utilize a combination of pivoted levers and fluid or hydraulic shock absorbing devices.

The absorption or dispersion of shock resulting from a collision of vehicles has been of major concern to automobile manufacturers for some time. Various devices have been proposed for the solution of this problem among which are liquid-filled bags with orifices for escaping of the liquid under impact, resiliently mounted bumpers, and bumpers restrained by pneumatic or hydraulic cylinders. These devices lack simplicity, variability or, in the case of the liquid-filled bags, repeatability, all essential to a practical solution to this problem.

The object of this invention is to provide a shock absorbing device for the bumper of a vehicle which uses a simple but rugged lever connected at one end to the vehicle bumper and at its other end to a standard hydraulic shock absorber.

As a more specific object, this invention seeks to provide a shock absorbing device for the bumper of a vehicle, the function of which can be made different for different vehicles simply by changing the relative lengths of the arms of a lever.

These and other objects of this invention will become apparent from the following detailed description of a preferred embodiment thereof when taken together with the accompanying drawings wherein:

FIG. 1 is a plan view in perspective of the shock absorbing device of this invention as installed in a vehicle, the latter shown in dotted outline; and FIG. 2 is a side elevational view of the shock absorbing device of FIG. 1 on an enlarged scale.

In its preferred form the device of this invention comprises a pair of substantially identical arms spaced from one another horizontally, each in the form of an inverted tee having a relatively short stem and a very long horizontal bar. The upper end of the stem of each tee is pivotally mounted on a frame element, one on each side of the vehicle such that the tee can swing as a pendulum about the pivot. The forward end of each horizontal bar is connected to and supports the vehicle bumper. The rear end of each horizontal bar is pivotally connected to the lower end of a substantially vertically disposed hydraulic shock absorber, the upper end of which is pivotally connected to the vehicle frame. Impacts received by the vehicle bumper are diverted by the tees to the shock absorbers where they are disperse by the normal functioning of a shock absorber.

Referring now to the drawings for a detailed description of the form shown therein, the vehicle to which the shock absorber is applied is shown in dotted outline at 10. Said vehicle has a bumper 11, lateral spaced frame members 12, 13 and inverted U-shaped frame members 14, 15, 16 and 17 extending outwardly of frame members 12 and 13.

The shock absorbing device of this invention, which also functions as the support for bumper 11, is comprised of substantially identical thrust members 18 and 19. Each thrust member, in the form illustrated, is comprised of a pair of substantially identical forged inverted tees 20, 21, 22 and 23. Since each tee is essentially the same, only one will be described in detail.

Tee 20 has a long horizontal cross bar 24 from which extends upwardly a short stem 25 secured by a pivot 26 to frame member 14. The front end of bar 24 is bent at a right angle to the plane of the bar to form an attaching flange 27 for bumper 11. The rear end 28 of bar 24 is offset to form with the oppositely offset end 31 of tee 21 a yoke in which is pivoted the lower end 29 of a commercially available shock absorber 30. The upper end 32 of shock absorber 30 is pivotally connected to frame member 16.

It may be understood that tee 22 is identical with tee 20 and that tee 23 is identical with tee 21, and that tee 21 is essentially the same as tee 20 except that its ends are bent oppositely to the ends of tee 20. Adjacent tees 20 and 21 may be bolted or welded together and tees 22 and 23 may similarly be bolted or welded together.

In operation, an impact received by bumper 11 is transmitted to the tees 20, 21, 22 and 23 which then swing around their pivots 26 causing the lower ends of the shock absorbers to swing in an arc having an upward component to compress the fluid therein, thereby diverting as well as dispersing the force of the impact.

It is understood that the relative lengths of the bar and stem of each tee may be varied to accommodate the dimensions and requirements of the vehicle to which the tee is applied. It is understood further that, as shown, the stem may be offset from the center of the bar so that the movement of the rear end of the tee may be greater than the movement of the bumper or it may be less than the movement of the bumper, in the latter case allowing for a more gradual absorption of the impact upon the bumper because of the longer movement thereof. Other changes may be made in the invention by those skilled in this art without departing from the scope of the invention.

I claim:

1. A shock absorbing device for a vehicle or the like provided with a bumper and with spaced frame members, said device comprising at least one tee-shaped thrust member having a substantially horizontally disposed cross bar and a stem extending outwardly from the cross bar, means pivotally mounting the free end of the stem to a frame member for swinging movement about said pivot, means securing one end of the cross bar to the vehicle bumper, a fluid shock absorber, means securing the other end of the cross bar to one end of the shock absorber and means securing the other end of the shock absorber to the frame, said tee-shaped thrust member comprising a pair of forgings secured together and having diverging flanges at one end thereof for securement to the vehicle bumper, and diverging offsets at the other end and pivot means for securing one end of said fluid shock absorber to the thrust member between said diverging offsets.

2. A shock absorbing device as described in claim 1, the stem of each tee-shaped thrust member extending vertically upwardly and the shock absorbers being likewise vertically disposed to dissipate the force of an impact upon the bumper in an upward direction.

* * * * *